(No Model.)
W. H. C. GOODE.
EARTH SCRAPER.
No. 316,455. Patented Apr. 28, 1885.
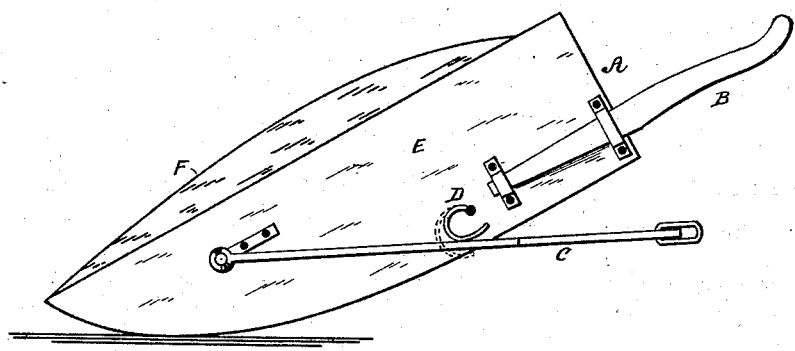
WITNESSES:
H. B. Brown
A. G. Lyne
INVENTOR:
Wm H. C. Goode
BY Munn & Co
ATTORNEYS.

UNITED STATES PATENT OFFICE.

WILLIAM H. C. GOODE, OF SIDNEY, OHIO.

EARTH-SCRAPER.

SPECIFICATION forming part of Letters Patent No. 316,455, dated April 28, 1885.

Application filed June 17, 1884. (No model.)

*To all whom it may concern:*

Be it known that I, WILLIAM H. C. GOODE, of Sidney, in the county of Shelby and State of Ohio, have invented a new and useful Improvement in Earth-Scrapers, of which the following is a full, clear, and exact description, reference being had to the annexed drawing, forming part of this specification.

The object of this invention is to prevent the handles of an earth-scraper, when the scraper is inverted, from being caught under the single-trees and causing a loss of time in releasing them therefrom preparatory to turning the scraper back upon its bottom.

The invention consists in providing elastic stops instead of rigid stops for this purpose, to the end that the elasticity of the stops shall cause a rocking or bouncing of the scraper as it moves along, which shall facilitate the turning of the scraper back upon its bottom, requiring very little effort on the part of the operator.

In the drawing, the figure is a side elevation of an inverted scraper, showing my invention.

A indicates the scraper-body, B the handles, and C the bail, which may be of any approved construction.

When the handles of the scraper are thrown forward to invert the scraper, the handles are ordinarily supported on the bail so near the ground that they are apt to be caught under the single-trees, and require to be released therefrom before the scraper can be turned back upon its bottom. To prevent this difficulty in handling the scraper, I provide elastic stops D on the sides E of the scraper, which are so located that when the scraper is inverted they will bear against the bail C and limit the downward movement of the rear end of the scraper, causing the handles B to be elevated sufficiently above the bail to prevent them from coming in contact with the single-trees. The elastic stops are preferably formed of curved flat springs, having one end made fast to the sides of the scraper and their free ends adapted to bear against the bail to support the body of the scraper in an inverted position.

The advantage of an elastic support for the inverted scraper is, that the movement of the scraper when drawn over the ground in an inverted position will cause compression of the springs and a bouncing motion of the scraper, throwing the handles up in easy reach of the operator and facilitating the turning of the scraper back upon its bottom.

F indicates ordinary runners attached to the bottom of the scraper.

What I claim is—

1. The combination, with the body of a scraper and the bail pivoted thereto, of stops consisting of springs secured to the sides of said body, for supporting the same on the bail in a partially-elevated position when inverted, substantially as shown and described, and for the purpose hereinbefore set forth.

2. The combination, with the body of a scraper and the bail pivoted thereto, of curved spring-stops D, secured at one end to the sides of the scraper, for the purpose described.

WM. H. C. GOODE.

Witnesses:
 A. G. LYNE,
 SOLON C. KEMON.